US012744845B2

(12) United States Patent
Yamamoto et al.

(10) Patent No.: US 12,744,845 B2
(45) Date of Patent: Sep. 22, 2026

(54) USER TERMINAL

(71) Applicant: NTT DOCOMO, INC., Tokyo (JP)

(72) Inventors: Naoki Yamamoto, Chiyoda-ku (JP); Takashi Hamatani, Chiyoda-ku (JP); Wataru Yamada, Chiyoda-ku (JP); Keiichi Ochiai, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 279 days.

(21) Appl. No.: 18/694,112

(22) PCT Filed: Sep. 28, 2022

(86) PCT No.: PCT/JP2022/036122

§ 371 (c)(1),
(2) Date: Mar. 21, 2024

(87) PCT Pub. No.: WO2023/054451

PCT Pub. Date: Apr. 6, 2023

(65) Prior Publication Data

US 2024/0388654 A1 Nov. 21, 2024

(30) Foreign Application Priority Data

Sep. 28, 2021 (JP) ................................ 2021-157539

(51) Int. Cl.
*H04M 1/72463* (2021.01)
*G06F 11/34* (2006.01)

(52) U.S. Cl.
CPC ... *H04M 1/724631* (2022.02); *G06F 11/3438* (2013.01)

(58) Field of Classification Search
CPC ....................... H04M 1/72463; G06F 11/3438
USPC ........................................................ 455/418
See application file for complete search history.

(56) References Cited

U.S. PATENT DOCUMENTS

2021/0109836 A1* 4/2021 Cranfill .................. G06F 3/048

FOREIGN PATENT DOCUMENTS

JP 2002-41175 A 2/2002
JP 2016-57845 A 4/2016

OTHER PUBLICATIONS

International Preliminary Report on Patentability and Written Opinion issued Apr. 11, 2024 in PCT/JP2022/036122, 5 pages.

(Continued)

*Primary Examiner* — Jirapon Tulop
(74) *Attorney, Agent, or Firm* — Oblon, McClelland, Maier & Neustadt, L.L.P.

(57) ABSTRACT

A user terminal 10 according to one embodiment is a user terminal configured to be able to execute a plurality of applications set in advance as targets for use limit. The user terminal (10) includes: a setting unit (11) configured to set a weight according to an application to each of a plurality of applications; a calculation unit (13) configured to calculate a degree of a user's use of the user terminal (10) on the basis of a use amount and a weight of the application used by the user in a predetermined period; and a display control unit (14) configured to hinder the user's use of the user terminal (10) by executing control of screen display of the user terminal (10) in a case in which the degree of use exceeds a predetermined threshold.

9 Claims, 8 Drawing Sheets

(56) References Cited

OTHER PUBLICATIONS

Japanese Office Action issued Aug. 20, 2024 in Japanese Patent Application No. 2023-551588 (with unedited, machine-generated English translation), 6 pages.
International Search Report mailed on Dec. 13, 2022 in PCT/JP2022/036122 filed on Sep. 28, 2022 (2 pages).

* cited by examiner

| APPLICATION ID | TYPE OF APPLICATION | AVERAGE USE TIME OF EACH APPLICATION (MTi) | AVERAGE USE TIME OF ALL APPLICATIONS (MT) | WEIGHT (Wi) |
|---|---|---|---|---|
| A1 | MAIL | 10min | 40min | 0.25(=10/40) |
| A2 | GAME | 60min | | 1.50(=60/40) |
| A3 | SNS | 80min | | 2.00(=80/40) |
| … | … | … | | … |

(B)

| APPLICATION ID | TYPE OF APPLICATION | AVERAGE USE TIME OF EACH APPLICATION (MTi) | AVERAGE USE TIME OF USER GROUP FOR EACH APPLICATION (GTi) | WEIGHT (Wi) |
|---|---|---|---|---|
| A1 | MAIL | 10min | 25min | 0.40(=10/25) |
| A2 | GAME | 60min | 20min | 3.00(=60/20) |
| A3 | SNS | 80min | 50min | 1.60(=80/50) |
| … | … | … | … | … |

APPLICATION PERIOD
TIME
D1
D2
t0
t1
t2
t3
T1
T2
T3

USER TERMINAL

TECHNICAL FIELD

One aspect of the present invention relates to a user terminal.

BACKGROUND ART

In Patent Literature 1, a structure in which a use limit time is set for each application installed in a user terminal (information terminal device), and a warning message is displayed on a screen before the use time of the application reaches the use limit time is disclosed.

CITATION LIST

Patent Literature

[Patent Literature 1] Japanese Unexamined Patent Publication No. 2016-57845

SUMMARY OF INVENTION

Technical Problem

Recently, occurrence of physical and mental health disorders according to long-time use (overuse) of user terminals has been causing problems. More specifically, in recent years, the number of persons suffering from visual display terminal (VDT) syndromes such as tired eyes or stiff shoulders has increased in accordance with long-time use of user terminals. According to the structure disclosed in Patent Document 1, a use limit time can be set in detail for each application. However, a user can use each application until reaching a user limit time thereof. For this reason, for example, in a case in which a plurality of applications are installed on a user terminal, even when a use limit time is set for each application using the structure described above, a total use time of the user terminal may be long. In other words, from a point of view of inhibiting long-time use of a user terminal, there is room for enhancement in the structure described above.

Thus, an object of one aspect of the present invention is to provide a user terminal capable of effectively inhibiting long-time use of the user terminal in a situation in which a plurality of applications can be used.

Solution to Problem

A user terminal according to one aspect of the present invention is a user terminal configured to be able to execute a plurality of applications set in advance as targets for a use limit, the user terminal including: a setting unit configured to set a weight according to an application for each of the plurality of applications; a calculation unit configured to calculate a degree of a user's use of the user terminal on the basis of a use amount and a weight of the application used by a user in a predetermined period; and a display control unit configured to hinder the user's use of the user terminal by executing control of screen display of the user terminal in a case in which the degree of use exceeds a predetermined threshold.

In the user terminal according to one aspect of the present invention, a weight is set for each application, and a degree of use of a user terminal is calculated on the basis of a use amount and a weight of each application in a predetermined period. Then, in a case in which the degree of use exceeds a threshold, control of screen display for hindering use of the user terminal is executed. According to the configuration described above, by setting an individual weight for each application, the degree of use of the user terminal can be calculated by comprehensively determining the user's use of not only one application but also a plurality of applications. Then, by executing the control of screen display in a case in which the degree of use becomes a constant value or more, the user can be urged to stop the use of the user terminal. Thus, according to the user terminal, in a situation in which a plurality of applications can be executed, long-time use of the user terminal can be effectively inhibited.

Advantageous Effects of Invention

According to one aspect of the present invention, a user terminal capable of effectively inhibiting long-time use of the user terminal in a situation in which a plurality of applications can be used can be provided.

BRIEF DESCRIPTION OF DRAWINGS

FIG. 2 is a diagram illustrating a first example and a second example of weighting of applications.

DESCRIPTION OF EMBODIMENTS

Hereinafter, one embodiment of the present invention will be described in detail with reference to the attached drawings. In description of the drawings, the same reference signs will be assigned to the same elements or elements corresponding to each other, and duplicate description will be omitted.

Figure 1:
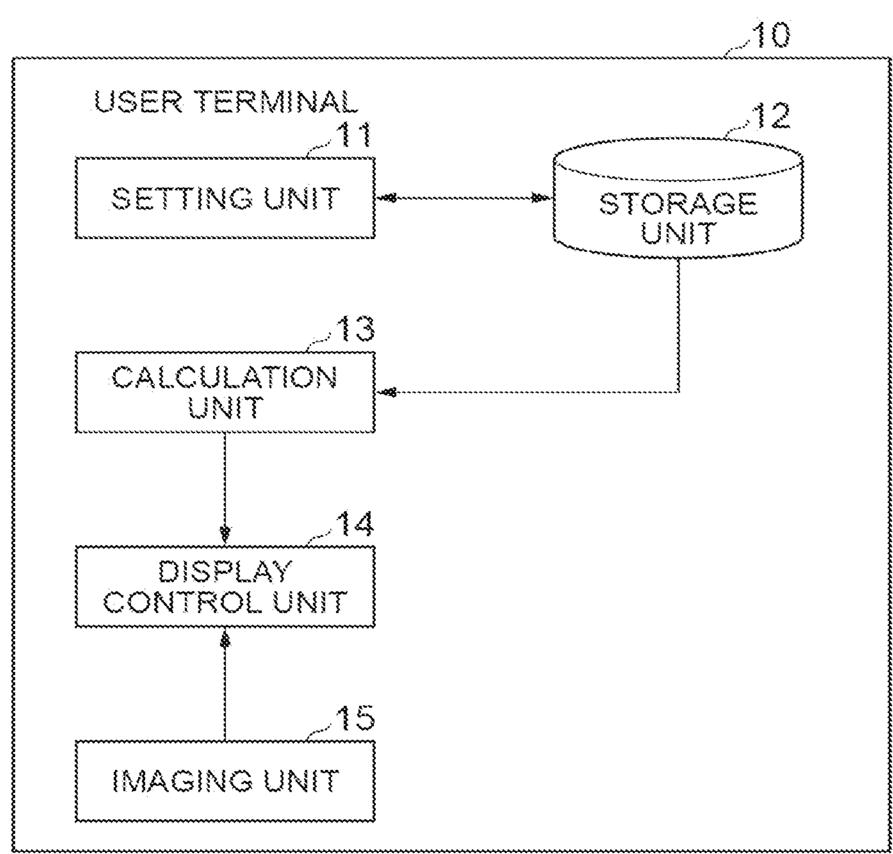
FIG. 1 is a diagram illustrating one example of a functional configuration of a user terminal according to one embodiment.

FIG. 1 is a diagram illustrating one example of a functional configuration of a user terminal 10 according to one embodiment. The user terminal 10 is a terminal device that is used by a user. The user terminal 10 at least includes a display (an output device 1006) that performs screen display. The user terminal 10 is configured to be able to execute a plurality of applications. In other words, a plurality of applications are installed in the user terminal 10 in advance. A user can select and execute an arbitrary application by operating the user terminal 10.

Examples of the user terminal 10 include a mobile telephone, a smartphone, a mobile terminal such as a tablet, and the like. However, the user terminal 10 is not limited to the example described above. For example, the user terminal 10 may be a portable PC such as a laptop PC or may be a stationary PC such as a desktop PC. In addition, the user terminal 10 may be a wearable terminal worn on a part of a user's body such as a head-mounted display, a smartwatch, or the like.

The user terminal 10 has a function for inhibiting a user's long-time use (overuse) of the user terminal 10. More specifically, the user terminal 10 is configured to perform screen display for hindering the use of the user terminal in a case in which a degree of use of the user terminal in a predetermined period exceeds a threshold set in advance. In this embodiment, as one example, the predetermined period is one day (24 hours of 0:00 to 24:00). However, the predetermined period is not limited to that described above. For example, in a case in which the user's continuous use of the user terminal 10 is desired to be inhibited, the predetermined period described above may be defined as "a period in which a user is continuously using the user terminal 10."

As illustrated in FIG. 1, the user terminal 10 includes a setting unit 11, a storage unit 12, a calculation unit 13, a display control unit 14, and an imaging unit 15.

The setting unit 11 sets a weight corresponding to each application for each of a plurality of applications set in advance as targets for a use limit. As one example, the setting unit 11 sets a weight for each application on the basis of a use result of the user terminal 10 according to a user in a past period. As the past period, for example, a period of an arbitrary length such as the past week, month, year, or the like can be used. The use result is information representing a use time (a time in which a user has used each application), a number of uses (for example, the number of times a predetermined operation (for example, posting of an SNS message or the like) set in advance has been executed, the number of times the application has been started, or the like), and the like for each application. In this embodiment, as one example, the use result is a use time for each application. For example, applications up to the top N (here, N is an arbitrary integer of two or more) ranks of use results in a past period can be set as applications that are targets for a use limit.

In this embodiment, the use results of the past period are stored in the storage unit 12. By accessing the storage unit 12, the setting unit 11 refers to use results of the past period. A first example and a second example of weighting will be described with reference to FIG. 2.

First Example of Weighting (A) of FIG. 2 illustrates the first example of weighting. In the first example, the setting unit 11, on the basis of the use results of the past period, calculates an average use time MTi (a first average use amount) per predetermined period (in this embodiment, "1 day (24 hours)") for each application Ai (i=1, . . . , N) that is a target for a use limit and an average use time MT (a second average use amount) per predetermined period for all the applications that are targets for the use limit.

In the example of (A) of FIG. 2, an average use time MTI of Application A1 that is a mail application is "10 minutes," an average use time MT2 of Application A2 that is a game application is "60 minutes," and an average use time MT3 of Application A3 that is an SNS application is "80 minutes." In addition, an average use time MT of all the applications that are targets for the use limit is "40 minutes."

In the first example, the setting unit 11 sets a weight Wi of each application Ai on the basis of an average use time MT of all the applications and an average use time MTi of each application Ai. As one example, the setting unit 11 sets the weight Wi of each application Ai on the basis of the following Equation (1). In other words, the setting unit 11 sets a ratio of the average use time MTi of each application Ai to the average use time MT of all the applications as a weight Wi of each application Ai.

$$Wi = MTi/MT \quad \text{Equation (1)}$$

As a result, in the example of (A) of FIG. 2, the weight W1 of the application A1 is set to "0.25(=10/40)," the weight W2 of the application A2 is set to "1.50(=60/40)," and the weight W3 of the application A3 is set to "2.00(=80/40)."

According to the first example, the longer a user's average use time of an application (in other words, the higher the influence of an application on long-time use of the user terminal 10), the larger a weight is set. In other words, weighting of each application can be appropriately performed such that the higher a degree of contribution of an application to long-time use of the user terminal 10, the higher a degree of the use limit. As a result, long-time use of the user terminal 10 can be effectively inhibited.

Second Example of Weighting (B) of FIG. 2 illustrates a second example of weighting. In the second example, similar to the first example, the setting unit 11 calculates an average use time MTi (a first average use amount) per predetermined period ("one day (24 hours)" in this embodiment) of each application Ai (here, i=1, . . . , N) on the basis of use results of a past period. In addition, in the second example, the setting unit 11 acquires an average use time GTi (a third average use amount) of each application Ai per predetermined period aggregated for a plurality of users (a user group) including users other than a user of interest (a user of the user terminal 10).

In the example of (B) of FIG. 2, the average use time GT1 of the user group for an application A1 is "25 minutes," the average use time GT2 of the user group for an application A2 is "20 minutes," and the average use time GT3 of the user group for an application A3 is "50 minutes."

In the second example, the setting unit 11 sets a weight Wi of each application Ai on the basis of the average use time MTi of each application Ai and the average use time GTi of the user group. As one example, the setting unit 11 sets a weight Wi of each application Ai on the basis of the following Equation (2). In other words, the setting unit 11 sets a ratio of the average use time Mti to the average use time GTi of the user group as the weight Wi of each application Ai.

$$Wi = MTi/GTi \quad \text{Equation (2)}$$

As a result, in the example of (B) of FIG. 2, the weight W1 of the application A1 is set to "0.40(=10/25)," the weight W2 of the application A2 is set to "3.00(=60/20)," and the weight W3 of the application A3 is set to "1.60(=80/50)."

According to the second example, the longer a user's average use time MTi of an application with respect to the average use time GTi of a user group, the larger a weight is set. In other words, weighting of each application can be appropriately performed such that a degree of a use limit for an application of which a user's use time exceeds an appropriate use time (that is, the average use time GTi) perceived from the trend of the user group becomes high. As a result, by inhibiting the use of an application exceeding an appropriate use time, the user's long-time use of the user terminal 10 can be effectively inhibited.

The calculation unit 13 calculates a degree of a user's use of the user terminal 10 on the basis of a use amount and a weight of an application used by the user for a predetermined period (that is, a latest predetermined period). The use amount of an application, for example, is a use time, the number of uses (for example, the number of times a predetermined operation (for example, posting of an SNS message or the like) set in advance is performed, the number of times the application is started, and the like), and the like. In this embodiment, as a use amount of an application, a use time of the application is used.

The calculation unit 13, for example, calculates a degree of use UR of a predetermined period on the basis of the following Equation (3). In the following Equation (3), "UTi" represents a use time of an application Ai (here, i=1, . . . , N) used by a user for a predetermined period. In other words, the calculation unit 13 calculates a numerical value acquired by adding products of a weight Wi of each application Ai and a use time Uti for all the applications as a degree of use UR.

$$UR = \Sigma_i^N (Wi \times UTi) \quad \text{Equation (3)}$$

In a case in which the degree of use UR calculated by the calculation unit 13 exceeds a threshold d set in advance, the display control unit 14 hinders the user's use of the user terminal 10 by performing control of screen display of the user terminal 10.

The imaging unit 15 images a face of a user using the user terminal 10. For example, the imaging unit 15 can be configured using a camera disposed to be able to perform imaging while facing forward from the screen (in other words, when the user terminal 10 is used, in a direction in which the user's face is positioned) near the display of the user terminal 10. The imaging unit 15 images a face of the user using the user terminal 10 in real time.

Hereinafter, a first example to a fourth example of control of screen display for hindering the use of the user terminal 10 will be described with reference to FIGS. 3 to 5.

First Example of Control of Screen Display

Figure 3:
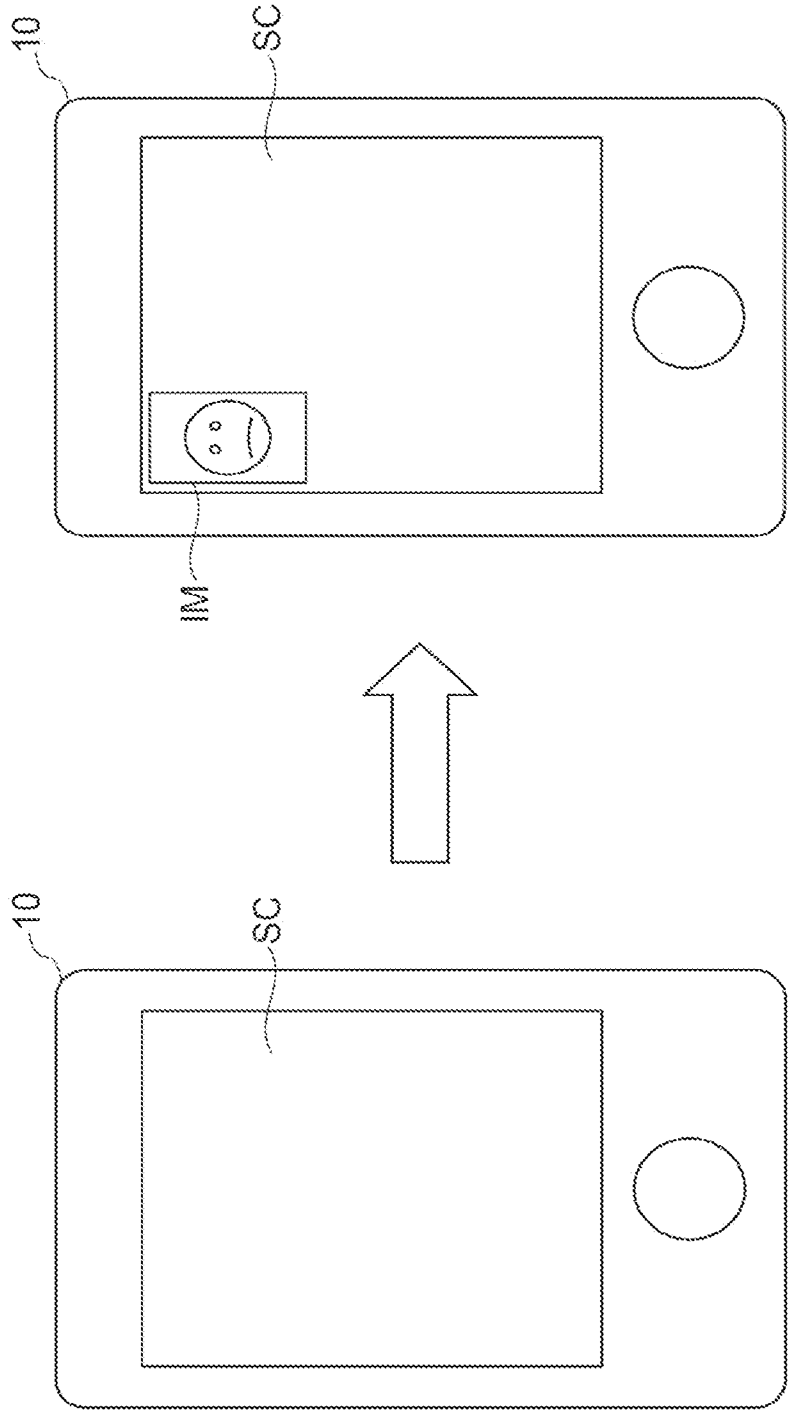
FIG. 3 is a diagram illustrating a first example of control of screen display.

As illustrated in FIG. 3, the display control unit 14 may display a face image IM of a user in an area of a part of the inside of a screen SC of the user terminal 10 (in the example illustrated in FIG. 3, an area of an upper left corner) in a case in which the degree of use UR exceeds the threshold d. A left side of FIG. 3 illustrates a state before the degree of use UR exceeds the threshold d (in other words, a state in which the face image IM is not displayed inside the screen SC). A right side of FIG. 3 illustrates a state after the degree of use UR exceeds the threshold d (in other words, a state in which the face image IM is being displayed inside the screen SC).

The face image IM to be displayed inside the screen SC may be captured in advance and be stored in the user terminal 10 (for example the storage unit 12). In this case, the display control unit 14 may acquire a face image IM by accessing the storage unit 12 and display this face image IM inside the screen SC. Alternatively, the display control unit 14 may display a face image IM, which has been imaged in real time by the imaging unit 15, representing a face of a user in an area of a part of the inside of the screen SC.

According to the control of screen display of the first example, by hiding a part of the inside of the screen SC by the face image IM, the use of the user terminal 10 can be hindered (obstructed). In addition, by displaying the face image IM of the user himself or herself inside the screen SC, as a psychological effect, a user can be caused to have a guilty feeling for long-time use of the user terminal 10. As a result, the user can be effectively urged to stop the use of the user terminal 10.

In addition, in a case in which a face image IM representing a face of a user imaged in real time by the imaging unit 15 is displayed inside the screen SC, a user's face that is in the state of being tired due to long-time use of the user terminal 10 can be presented to the user. In other words, the user can be caused to conceive that he or she is tired due to long-time use of the user terminal 10. As a result, a user can be furthermore effectively urged to stop the use of the user terminal 10.

Second Example of Control of Screen Display

Figure 4:
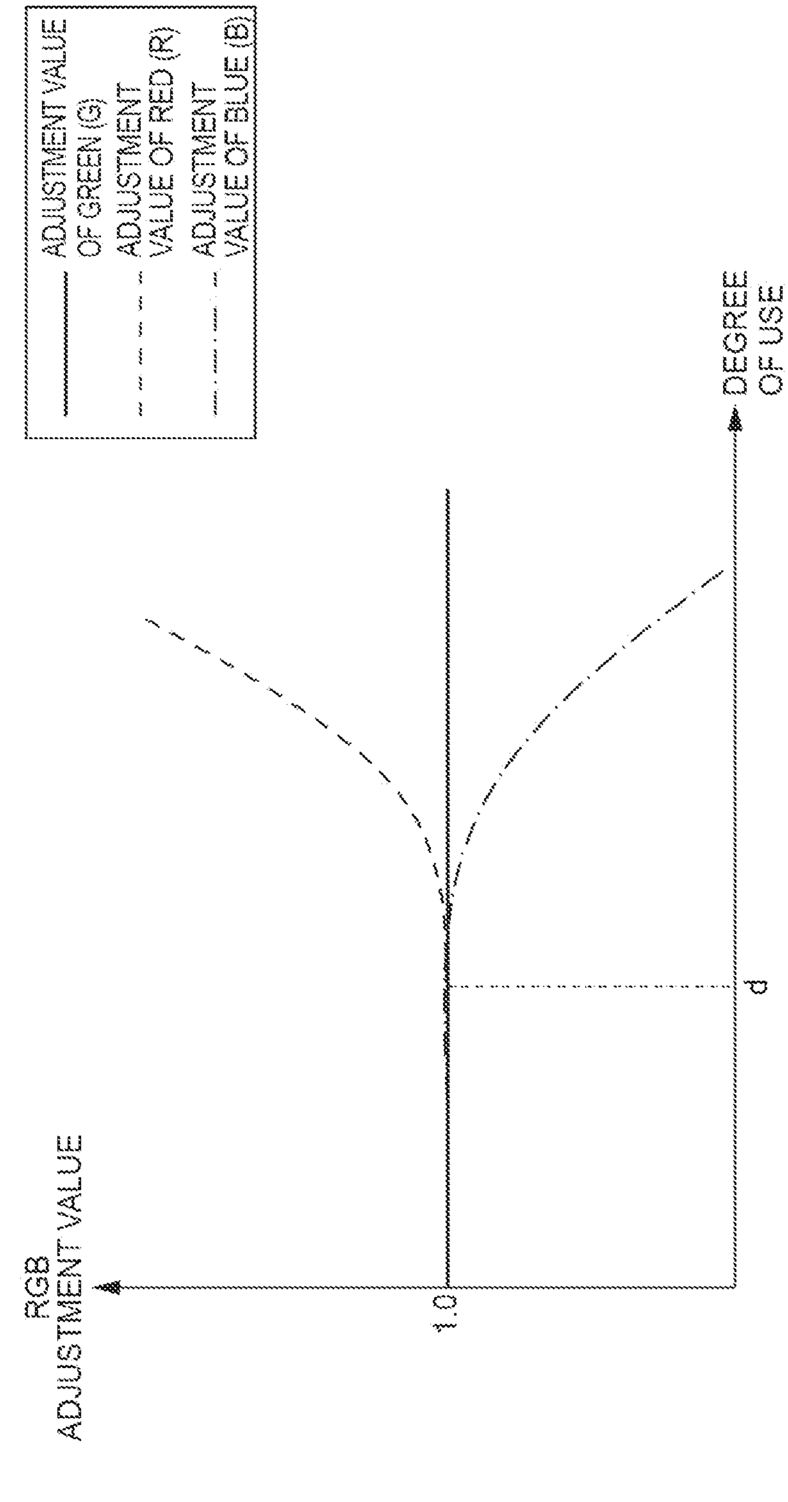
FIG. 4 is a diagram illustrating a second example of control of screen display.

As illustrated in FIG. 4, the display control unit 14 may change the color (for example, RGB values) of the screen SC of the user terminal 10 in a case in which the degree of use UR exceeds the threshold d. For example, in a case in which a user continues to use the user terminal 10 even after the degree of use UR exceeds the threshold d, the display control unit 14 may gradually reduce the visibility of the screen SC by gradually changing the color of the screen SC.

In the example illustrated in FIG. 4, by multiplying RGB values (one example of the color) by adjustment values of respective colors, the display control unit 14 changes the RGB values. Until the degree of use UR exceeds the threshold d, all the adjustment values of the colors (green (G), red (R), and blue (B)) are "1". In other words, until the degree of use UR exceeds the threshold d, setting values set by the system (the user terminal 10) or the user are applied as they are to the RGB values of the screen SC. On the other hand, in a case in which the degree of use UR further increases in accordance with the user continuing to use the user terminal 10 even after the degree of use UR exceeds the threshold d, as one example, in accordance with an increase of the degree of use UR, the display control unit 14 gradually increases the adjustment value of red (R) and gradually decreases the adjustment value of blue (B). As a result, in accordance with an increase of the degree of use UR, the RGB values of the screen SC change, and the visibility gradually decreases.

According to the control of screen display of the second example, in a case in which the degree of use UR exceeds the threshold d, by reducing the visibility by changing the color (in this embodiment, RGB values) of the screen SC, a user can be effectively urged to stop the use of the user terminal 10.

Third Example of Control of Screen Display

Figure 5:
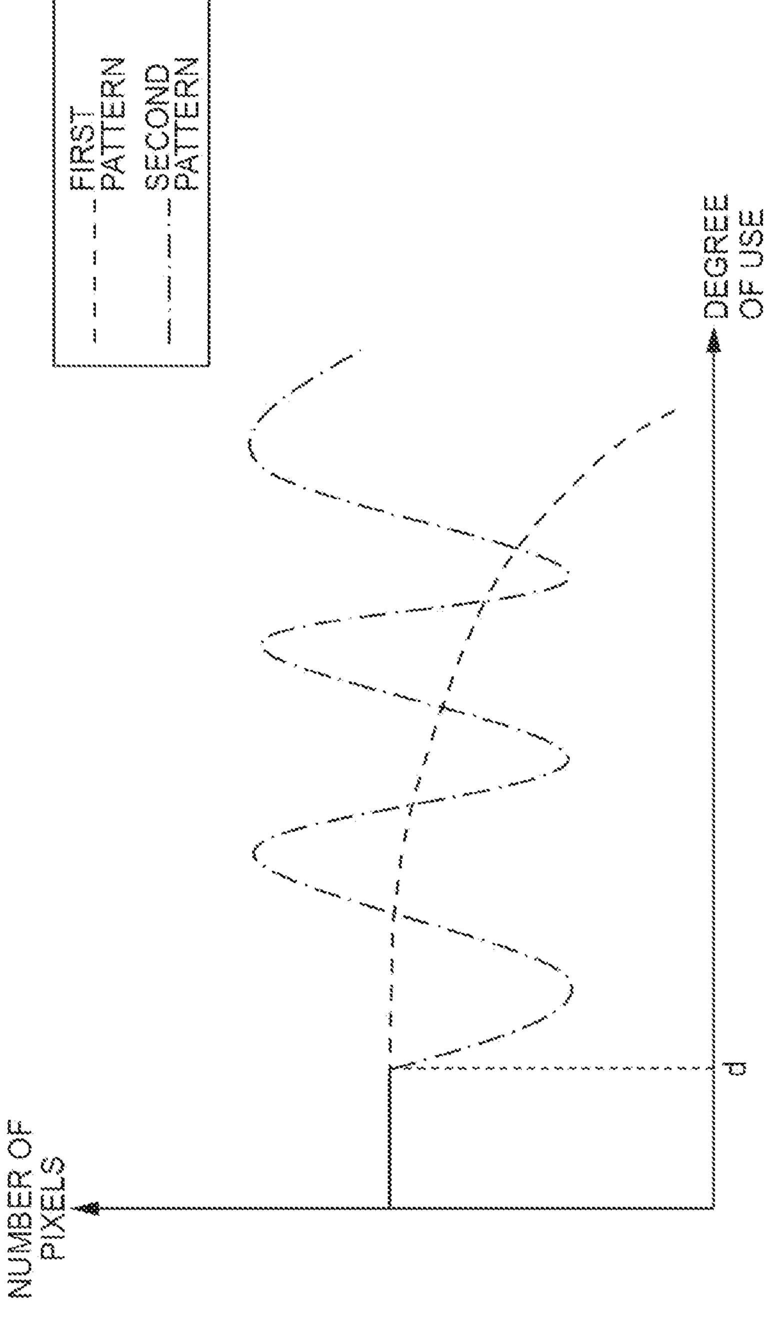
FIG. 5 is a diagram illustrating a third example and a fourth example of control of screen display.

As illustrated in FIG. 5, the display control unit 14 may change the number of pixels (resolution) of the screen SC of the user terminal 10 in a case in which the degree of use UR exceeds the threshold d.

As illustrated in a first pattern of FIG. 5, in a case in which a user continues to use the user terminal 10 even after the degree of use UR exceeds the threshold d, the display control unit 14 may gradually reduce the visibility of the screen SC by gradually changing (decreasing) the number of pixels of the screen SC in accordance with the degree of use UR. According to the first pattern, by reducing the visibility by changing the number of pixels of the screen SC, a user can be effectively urged to stop the use of the user terminal 10.

As illustrated in a second pattern of FIG. 5, in a case in which a user continues to use the user terminal 10 even after the degree of use UR exceeds the threshold d, the display control unit 14 may alternately repeat to increase and decrease the number of pixels of the screen SC. According to the second pattern, concentration (immersion) of the user for the screen SC is hindered. As a result, the user can be effectively urged to stop the use of the user terminal 10.

The display control unit 14 sets an application period in which the control of screen display described above is applied. Hereinafter, several examples of the application period will be described.

First Example of Application Period

Figure 6:
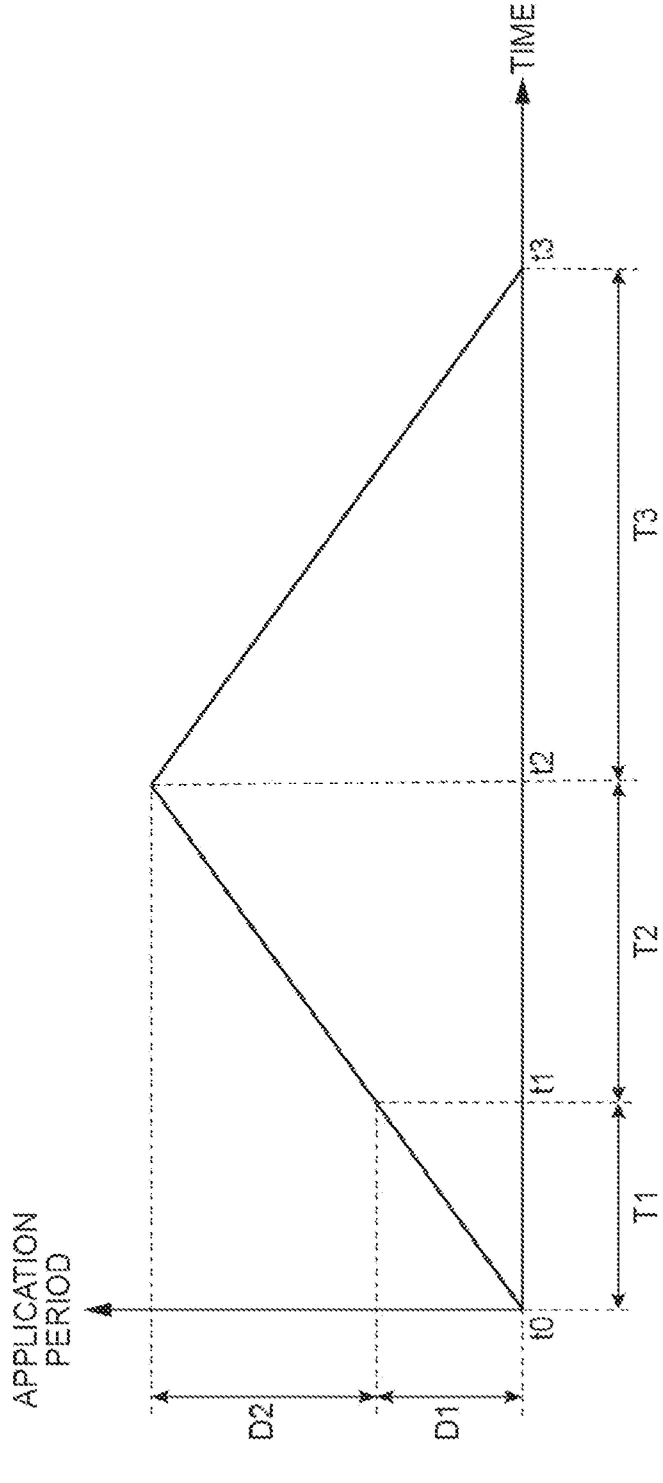
FIG. 6 is a diagram illustrating a first example of an application period in which control of screen display is applied.

As illustrated in FIG. 6, in a case in which the user terminal 10 is continued to be used by a user, the display control unit 14 may set a period of the same length as that of a period T1 from a use start time point (time point t0) of the user terminal 10 to a time point (time point t1) at which the degree of use UR has exceeded the threshold d as an application period D1.

When a period in which the user terminal 10 has not been used elapses the application period D1 after control of screen display started in accordance with the degree of use UR exceeding the threshold d (in other words, after the time point t1), the display control unit 14 ends the application of the control of screen display. In other words, in a case in which a user immediately stops the use of the user terminal 10 by being triggered upon execution of control of screen display using the display control unit 14 at the time point t1, at a time point at which the application period D1 has elapsed from the time point t1, the application of the control of screen display ends. Then, when the application period D1 expires, the display control unit 14 resets the degree of use UR. Thus, in a case in which the user has restarted the use of the user terminal 10 after elapse of the application period D1 from the time point t1, the control of screen display using the display control unit 14 is not executed. However, in a case in which the user terminal 10 is used until the application period D1 of control of screen display ends after start of the control of screen display, the display control unit 14 extends the application period D1 in accordance with a time in which the user terminal 10 has been used.

In the example illustrated in FIG. 6, also after the time point t1 at which the degree of use UR has exceeded the threshold d, and control of screen display (for example, any one of the first example to the third example of the control of screen display described above) has started, a user has continued to use the user terminal 10 and stopped the use of the user terminal 10 at a time point t2. In other words, in a period T2 from the time point t1 to the time point t2, the user has continued to use the user terminal 10 although the control of screen display using the display control unit 14 has started. In addition, a time point at which the use of the user terminal 10 has stopped, for example, is a time point at which the screen display becomes off in accordance with a power button of the user terminal 10 being pressed or the like. In such a case, the display control unit 14 extends the application period D1 in accordance with a time (the period T2 in the example illustrated in FIG. 6) in which the user terminal 10 has been used after start of the control of screen display (after the time point t1). In the example illustrated in FIG. 6, the display control unit 14 sets a period of the same length as that of the period T2 as an extension period D2. In this case, from the time point t2 at which the use of the user terminal 10 has stopped to a time point t3 at which the application period, to which the extension period has been added, (that is, "D1+D2") has elapsed, the control of screen display is applied. In other words, in a period T3 from the time point t2 to the time point t3, in a case in which the user has restarted the use of the user terminal 10 again (in other words, in a case in which the screen display has become on), the control of screen display using the display control unit 14 described above is executed. In other words, in a case in which the first example of the screen display described above is executed, a face image IM is displayed inside the screen SC.

According to the application period of the first example, in a case in which user's use of the user terminal 10 is continued after control of screen display starts, by imposing an extension period D2 according to a continuously used time as a penalty, the user can be effectively urged to stop the use of the user terminal 10. More specifically, in a case in which the application period according to the first example is set, by stopping the use of the user terminal 10 as soon as possible after start of control of screen display, a period in which the control of screen display is applied can be shortened as possibly. For this reason, according to the application period of the first example, a user can be urged to stop the use of the user terminal 10 immediately after start of control of screen display.

Second Example of Application Period

The display control unit 14 may compare a use time Uti of an application Ai used by a user in a predetermined period with the average use time GTi described above and determine an application period in which control of screen display is applied on the basis of a result of the comparison. For example, the display control unit 14, for each of applications Ai up to top K ranks of which use times are long compared to a general use trend (in other words, an average use time GTi), calculates a difference between the use time Uti of the application Ai in the predetermined period described above and the average use time GTi (Uti−GTi). Then, the display control unit 14 may set a total of the above-described differences calculated for applications Ai up to top K ranks of magnitudes of the differences described above (that is, $\Sigma_i^K$ (Uti−GTi)) as an application period (that is, a period until control of screen display using the display control unit 14 is invalidated after the degree of use UR exceeds the threshold d).

According to the application period of the second example, a time corresponding to an amount of time used more than a general use amount can be set as a penalty (that is, a period in which control of screen display using the display control unit 14 is executed) for a user. Thus, a user can be urged to refrain from use of an application exceeding a general use amount. In addition, in a case in which not a user time but the number of times of use is used as a use amount, a period according to a difference in the number of times of use (for example, a product between "a difference in the number of times of use" and "a unit period of a length set in advance" or the like) may be set as an application period.

The application period is not limited to the first example and the second example described above. For example, simply, a fixed period set in advance (for example, 30 minutes or the like) may be used as an application period.

Figure 7:
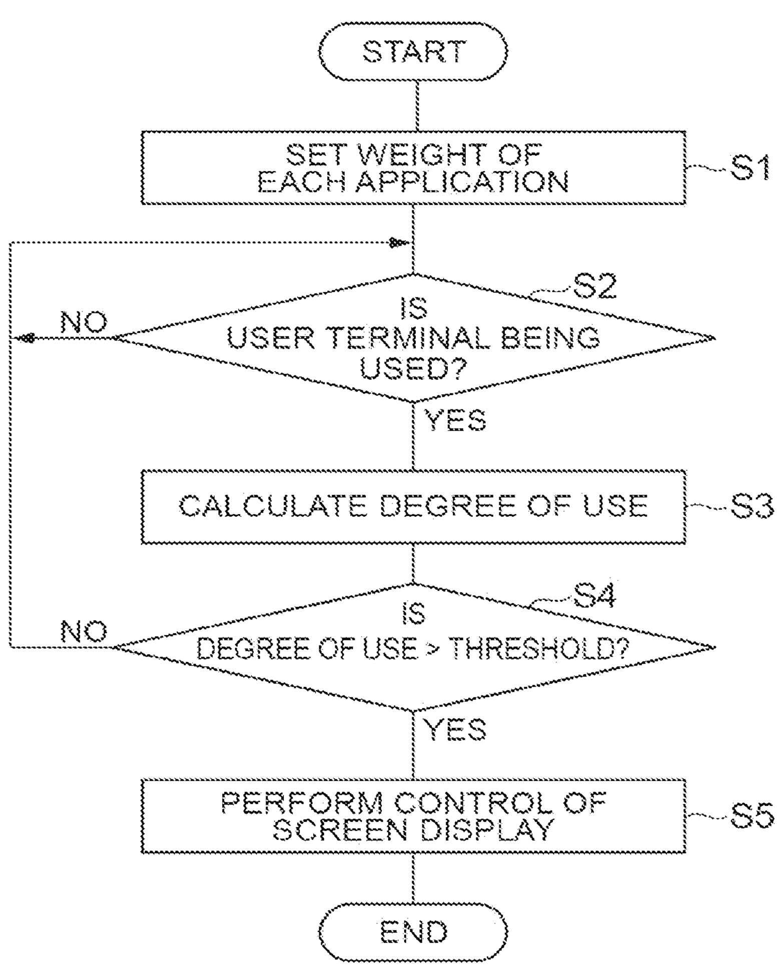
FIG. 7 is a flowchart illustrating one example of operations of a user terminal.

Next, one example of operations of the user terminal 10 (including an information processing method according to an embodiment) will be described with reference to FIG. 7.

In Step S1, for example, by executing the first example or the second example of weighting described above (see FIG. 2), the setting unit 11 sets a weight Wi of each application Ai set as a target for use limit.

In Step S2, the calculation unit 13 determines whether or not the user terminal 10 is being used by a user. In a case in which the user terminal 10 is being used by the user (Step S2: Yes), for example, by using Equation (3) described above, the calculation unit 13 calculates a degree of use UR (Step S3). On the other hand, in a case in which the user terminal 10 is not being used by the user (Step S2: No), the process of Step S3 is not executed until the user terminal 10 is used by the user.

In Step S4, the display control unit 14 determines whether or not the degree of use UR calculated in Step S3 exceeds the threshold d. In a case in which the degree of use UR exceeds the threshold d (Step S4: Yes), the display control unit 14 executes control of screen display (for example, any one of the first example to the third example of the control of screen display described above). As one example, control of screen display using the display control unit 14 is applied until the application period described above expires. After the application period expires, the display control unit 14 ends the control of screen display and resets the degree of use. Thereafter, the user can use the user terminal 10 as usually.

In the user terminal 10 described above, the weight Wi is set for each application Ai, and a degree of use UR of the user terminal 10 is calculated on the basis of a use amount (in this embodiment, a use time) and a weight Wi of each application Ai in a predetermined period. Then, in a case in which the degree of use UR exceeds the threshold d, control of screen display for hindering the use of user terminal 10 is executed. According to the configuration described above, by setting an individual weight Wi for each application Ai, the degree of use UR of the user terminal 10 can be calculated by comprehensively determining user's use of not only one application but also a plurality of applications. Then, by executing the control of screen display in a case in which the degree of use UR becomes a constant value or more, the user can be urged to stop the use of the user terminal 10. Thus, according to the user terminal 10, in a situation in which a plurality of applications can be executed, long-time use of the user terminal 10 can be effectively inhibited.

In addition, in the embodiment described above, although a use time of each application in a predetermined period has been used as a use amount of each application, the number of times of use of each application in a predetermined period may be used as a use amount of each application. Alternatively, an index value based on both a use time of each application and the number of times of use in a predetermined period may be used as a use amount of each application.

In addition, in the first example and the second example of weighting described above, a use time of each application is used as a use amount, and thus the average use times MTi, MT, and GTi have been used as a first average use amount, a second average use amount, and a third average use amount. However, in a case in which the number of times of use of each application is used as a use amount, "an average number of times of each application Ai per predetermined period" may be used in place of the average use time MTi, "an average number of times of all the applications per predetermined period" may be used in place of the average use time MT, and "an average number of times of each application Ai per predetermined period aggregated for a user group" may be used in place of the average use time GTi.

Furthermore, the control of screen display for hindering the use of the user terminal 10 is not limited to the first example to the third example described above. In addition, two or more of controls of the first example to the third example described above may be combined together. For example, in a case in which the degree of use UR exceeds the threshold d, the display control unit 14 may change the color (RGB values) and the number of pixels while displaying a face image IM of a user inside the screen SC.

The block diagrams used in the description of the embodiment show blocks in units of functions. These functional blocks (components) are realized in any combination of at least one of hardware and software. Further, a method of realizing each functional block is not particularly limited. That is, each functional block may be realized using one physically or logically coupled device, or may be realized by connecting two or more physically or logically separated devices directly or indirectly (for example, using a wired scheme, a wireless scheme, or the like) and using such a plurality of devices. The functional block may be realized by combining the one device or the plurality of devices with software.

The functions include judging, deciding, determining, calculating, computing, processing, deriving, investigating, searching, confirming, receiving, transmitting, outputting, accessing, resolving, selecting, choosing, establishing, comparing, assuming, expecting, regarding, broadcasting, notifying, communicating, forwarding, configuring, reconfiguring, allocating, mapping, assigning, or the like, but not limited thereto.

Figure 8:
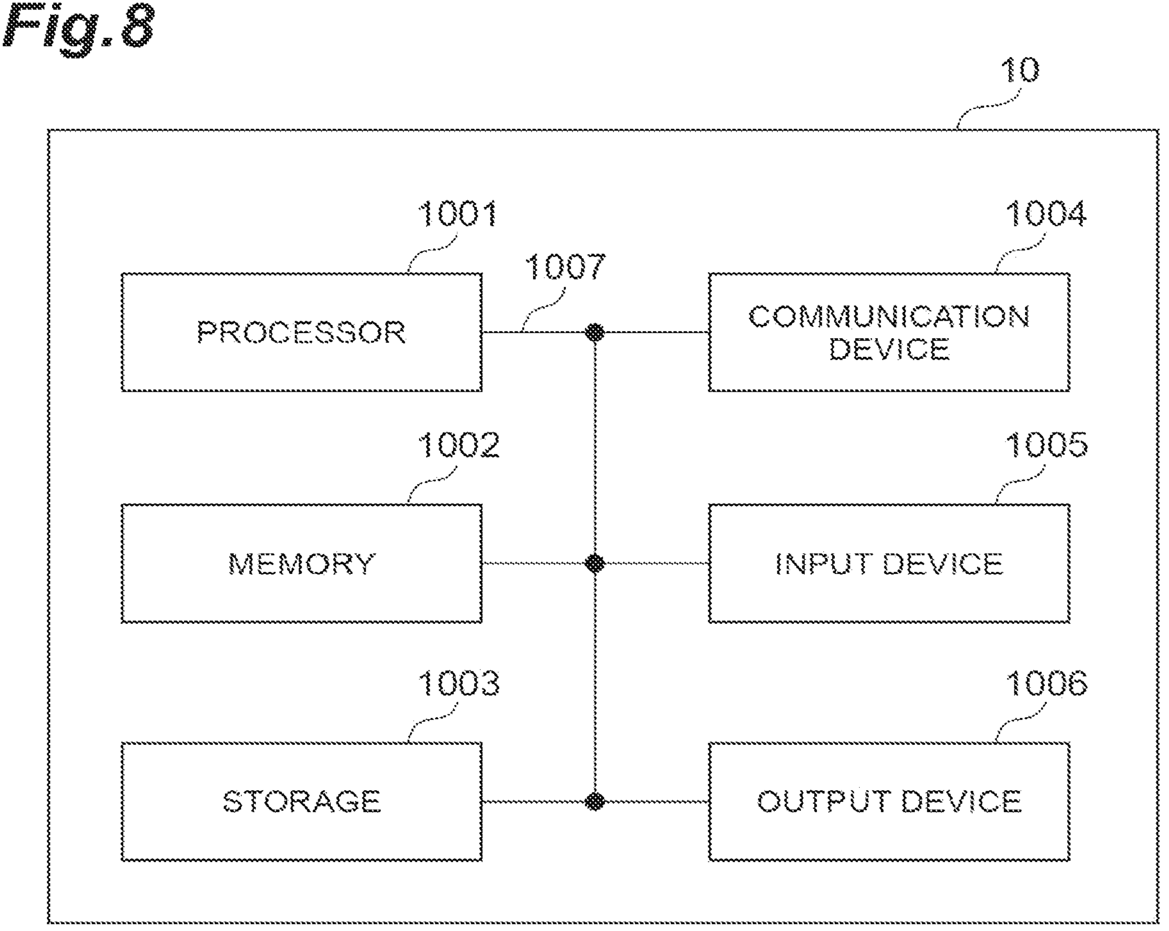
FIG. 8 is a diagram illustrating one example of a hardware configuration of a user terminal.

For example, the user terminal 10 according to an embodiment of the present invention may function as a computer that performs information processing method of the present disclosure. FIG. 8 is a diagram illustrating an example of a hardware configuration of the user terminal 10 according to the embodiment of the present disclosure. The user terminal 10 described above may be physically configured as a computer device including a processor 1001, a memory 1002, a storage 1003, a communication device 1004, an input device 1005, an output device 1006, a bus 1007, and the like.

In the following description, the term "device" can be referred to as a circuit, a device, a unit, or the like. The hardware configuration of the user terminal 10 may include one or a plurality of devices illustrated in FIG. 8, or may be configured without including some of the devices.

Each function in the user terminal 10 is realized by loading predetermined software (a program) into hardware such as the processor 1001 or the memory 1002 so that the processor 1001 performs computation to control communication that is performed by the communication device 1004 or control at least one of reading and writing of data in the memory 1002 and the storage 1003.

The processor 1001, for example, operates an operating system to control the entire computer. The processor 1001 may be configured as a central processing unit (CPU) including an interface with peripheral devices, a control device, a computation device, a register, and the like.

Further, the processor 1001 reads a program (program code), a software module, data, or the like from at one of the storage 1003 and the communication device 1004 into the memory 1002 and executes various processes according to the program, the software module, the data, or the like. As the program, a program for causing the computer to execute at least some of the operations described in the above-described embodiment may be used. For example, each functional unit (e.g., the display control unit 14) of the user terminal 10 may be realized by a control program that is stored in the memory 1002 and operated on the processor 1001, and other functional blocks may be realized similarly. Although the case in which the various processes described above are executed by one processor 1001 has been described, the processes may be executed simultaneously or sequentially by two or more processors 1001. The processor 1001 may be realized using one or more chips. The program may be transmitted from a network via an electric communication line.

The memory 1002 is a computer-readable recording medium and may be configured of, for example, at least one of a read only memory (ROM), an erasable programmable ROM (EPROM), an electrically erasable programmable ROM (EEPROM), and a random access memory (RAM). The memory 1002 may be referred to as a register, a cache, a main memory (a main storage device), or the like. The memory 1002 can store an executable program (program code), software modules, and the like in order to implement the information processing method according to the embodiment of the present disclosure.

The storage 1003 is a computer-readable recording medium and may also be configured of, for example, at least one of an optical disc such as a compact disc ROM (CD-ROM), a hard disk drive, a flexible disc, a magneto-optical disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium described above may be, for example, a database including at least one of the memory 1002 and the storage 1003, a server, or another appropriate medium.

The communication device 1004 is hardware (a transmission and reception device) for performing communication between computers via at least one of a wired network and a wireless network and is also referred to as a network device, a network controller, a network card, or a communication module, for example.

The input device 1005 is an input device (for example, a keyboard, a mouse, a microphone, a switch, a button, or a sensor) that receives an input from the outside. The output device 1006 is an output device (for example, a display, a speaker, or an LED lamp) that performs output to the outside. The input device 1005 and the output device 1006 may have an integrated configuration (for example, a touch panel).

Further, the respective devices such as the processor 1001 and the memory 1002 are connected by the bus 1007 for information communication. The bus 1007 may be configured using a single bus or may be configured using buses different between the devices.

Further, the user terminal 10 may include hardware such as a microprocessor, a digital signal processor (DSP), an application specific integrated circuit (ASIC), a programmable logic device (PLD), or a field programmable gate array (FPGA), and some or all of the functional blocks may be realized by the hardware. For example, the processor 1001 may be implemented by at least one of these pieces of hardware.

Although the present embodiment has been described in detail above, it is apparent to those skilled in the art that the present embodiment is not limited to the embodiments described in the present disclosure. The present embodiment can be implemented as a modification and change aspect without departing from the spirit and scope of the present invention determined by description of the claims. Accordingly, the description of the present disclosure is intended for the purpose of illustration and does not have any restrictive meaning with respect to the present embodiment.

A process procedure, a sequence, a flowchart, and the like in each aspect/embodiment described in the present disclosure may be in a different order unless inconsistency arises. For example, for the method described in the present disclosure, elements of various steps are presented in an exemplified order, and the elements are not limited to the presented specific order.

Input or output information or the like may be stored in a specific place (for example, a memory) or may be managed in a management table. Information or the like to be input or output can be overwritten, updated, or additionally written. Output information or the like may be deleted. Input information or the like may be transmitted to another device.

A determination may be performed using a value (0 or 1) represented by one bit, may be performed using a Boolean value (true or false), or may be performed through a numerical value comparison (for example, comparison with a predetermined value).

Each aspect/embodiment described in the present disclosure may be used alone, may be used in combination, or may be used by being switched according to the execution. Further, a notification of predetermined information (for example, a notification of "being X") is not limited to be made explicitly, and may be made implicitly (for example, a notification of the predetermined information is not made).

Software should be construed widely so that the software means an instruction, an instruction set, a code, a code segment, a program code, a program, a sub-program, a software module, an application, a software application, a software package, a routine, a sub-routine, an object, an executable file, a thread of execution, a procedure, a function, and the like regardless whether the software is called software, firmware, middleware, microcode, or hardware description language or called another name.

Further, software, instructions, information, and the like may be transmitted and received via a transmission medium. For example, when software is transmitted from a website, a server, or another remote source using wired technology (a coaxial cable, an optical fiber cable, a twisted pair, a digital subscriber line (DSL), or the like) and wireless technology (infrared rays, microwaves, or the like), at least one of the wired technology and the wireless technology is included in a definition of the transmission medium.

The information, signals, and the like described in the present disclosure may be represented using any of various different technologies. For example, data, an instruction, a command, information, a signal, a bit, a symbol, a chip, and the like that can be referred to throughout the above description may be represented by a voltage, a current, an electromagnetic wave, a magnetic field or a magnetic particle, an optical field or a photon, or an arbitrary combination of them.

Further, the information, parameters, and the like described in the present disclosure may be expressed using an absolute value, may be expressed using a relative value from a predetermined value, or may be expressed using another corresponding information.

Names used for the above-described parameters are not limited names in any way. Further, equations or the like using these parameters may be different from those explicitly disclosed in the present disclosure. Since various information elements can be identified by any suitable names, the various names assigned to these various information elements are not limited names in any way.

The description "based on (on the basis of)" used in the present disclosure does not mean "based only on" unless otherwise noted. In other words, the description "based on" means both of "based only on" and "based at least on".

Any reference to elements using designations such as "first," "second," or the like used in the present disclosure does not generally limit the quantity or order of those elements. These designations may be used in the present disclosure as a convenient way for distinguishing between two or more elements. Thus, the reference to the first and second elements does not mean that only two elements can be adopted there or that the first element has to precede the second element in some way.

When "include", "including" and transformation of them are used in the present disclosure, these terms are intended to be comprehensive like the term "comprising". Further, the term "or" used in the present disclosure is intended not to be exclusive OR.

In the present disclosure, for example, when articles such as "a", "an", and "the" in English are added by translation, the present disclosure may include that nouns following these articles are plural.

In the present disclosure, a sentence "A and B are different" may mean that "A and B are different from each other". The sentence may mean that "each of A and B is different from C". Terms such as "separate", "coupled", and the like may also be interpreted, similar to "different".

REFERENCE SIGNS LIST

10 User terminal
11 Setting unit
13 Calculation unit
14 Display control unit
15 Imaging unit
IM Face image
SC Screen

The invention claimed is:

1. A user terminal configured to be able to execute a plurality of applications set in advance as targets for a use limit, the user terminal comprising:
processing circuitry configured to
set a weight according to an application for each of the plurality of applications;
calculate a degree of a user's use of the user terminal on the basis of a use amount and a weight of the application used by a user in a predetermined period; and
hinder the user's use of the user terminal by executing control of screen display of the user terminal in a case in which the degree of use exceeds a predetermined threshold,
wherein the processing circuitry is configured to display a face image of the user in an area of a part of a screen of the user terminal as the control of screen display.

2. The user terminal according to claim 1, wherein the processing circuitry is configured to image a face of the user who is using the user terminal, and
wherein the processing circuitry is configured to display the face image representing the face of the user imaged in real time in the area of the part of the screen of the user terminal as the control of screen display.

3. The user terminal according to claim 1, wherein the processing circuitry is configured to change a color or the number of pixels of the screen of the user terminal as the control of screen display.

4. The user terminal according to claim 3, wherein, in a case in which the user continues to use the user terminal even after the degree of use exceeds the threshold, the processing circuitry gradually reduces visibility of the screen of the user terminal by gradually changing the color or the number of pixels of the screen of the user terminal.

5. The user terminal according to claim 3, wherein, in a case in which the user continues to use the user terminal even after the degree of use exceeds the threshold, the processing circuitry alternately repeats decrease and increase of the number of pixels of the screen of the user terminal.

6. The user terminal according to claim 1, wherein the processing circuitry is configured to:
set an application period in which the control of screen display is applied;
end application of the control of screen display when a period in which the user terminal has not been used exceeds the application period after start of the control of the screen display; and
extend the application period in accordance with a time in which the user terminal has been used in a case in which the user terminal has been used until the application of the control of screen display ends after start of the control of screen display.

7. A user terminal configured to be able to execute a plurality of applications set in advance as targets for a use limit, the user terminal comprising:
processing circuitry configured to
set a weight according to an application for each of the plurality of applications;
calculate a degree of a user's use of the user terminal on the basis of a use amount and a weight of the application used by a user in a predetermined period; and
hinder the user's use of the user terminal by executing control of screen display of the user terminal in a case in which the degree of use exceeds a predetermined threshold,
wherein the processing circuitry is configured to:
calculate a first average use amount that is an average use amount of each of the applications per the predetermined period and a second average use amount that is an average use amount of all the applications per the predetermined period on the basis of the user's use results of the user terminal in a past period; and
set the weight of each of the applications on the basis of the second average use amount and the first average use amount of each of the applications.

8. A user terminal configured to be able to execute a plurality of applications set in advance as targets for a use limit, the user terminal comprising:
processing circuitry configured to
set a weight according to an application for each of the plurality of applications;
calculate a degree of a user's use of the user terminal on the basis of a use amount and a weight of the application used by a user in a predetermined period; and hinder the user's use of the user terminal by executing control of screen display of the user terminal in a case in which the degree of use exceeds a predetermined threshold, wherein the processing circuitry is configured to:

calculate a first average use amount that is an average use amount of each of the applications per the predetermined period and a third average use amount that is an average use amount of each of the applications per the predetermined period aggregated for a plurality of the users on the basis of the user's use results of the user terminal in a past period; and set the weight of each of the applications on the basis of the first average use amount and the third average use amount of each of the applications.

9. The user terminal according to claim 8, wherein the processing circuitry is configured to:

compare a use amount of the application used by the user in the predetermined period with the third average use amount; and determine a period in which the control of screen display is applied on the basis of a result of the comparison.

* * * * *